United States Patent
Buisson et al.

(10) Patent No.: US 11,415,292 B2
(45) Date of Patent: Aug. 16, 2022

(54) SIGNALING DEVICE FOR A MOTOR VEHICLE

(71) Applicant: MARELLI AUTOMOTIVE LIGHTING FRANCE, Saint-Julien-du-Sault (FR)

(72) Inventors: Alain Buisson, Trappes (FR); Sean Patterson, Trappes (FR)

(73) Assignee: MARELLI AUTOMOTIVE LIGHTING FRANCE, Saint-Julien-du-Sault (FR)

( * ) Notice: Subject to any disclaimer, the term of this patent is extended or adjusted under 35 U.S.C. 154(b) by 0 days.

(21) Appl. No.: 16/971,006

(22) PCT Filed: Feb. 19, 2019

(86) PCT No.: PCT/FR2019/050377
§ 371 (c)(1),
(2) Date: Oct. 5, 2020

(87) PCT Pub. No.: WO2019/158889
PCT Pub. Date: Aug. 22, 2019

(65) Prior Publication Data
US 2021/0062993 A1    Mar. 4, 2021

(30) Foreign Application Priority Data
Feb. 19, 2018 (FR) ..................................... 1851412

(51) Int. Cl.
*F21S 43/245* (2018.01)
*F21S 43/249* (2018.01)
(Continued)

(52) U.S. Cl.
CPC .......... *F21S 43/245* (2018.01); *B60Q 1/0011* (2013.01); *B60Q 1/26* (2013.01);
(Continued)

(58) Field of Classification Search
CPC ...... F21S 43/235; F21S 43/236; F21S 43/237; F21S 43/239; F21S 43/241; F21S 43/243;
(Continued)

(56) References Cited

U.S. PATENT DOCUMENTS 4,689,728 A    8/1987 Yamai et al.
7,726,854 B2 *  6/2010 Bourdin ................ F21S 43/245
                                                 362/487
(Continued)

FOREIGN PATENT DOCUMENTS

DE    3402473 A1    8/1984
DE    19753762 A1   6/1999
(Continued)

OTHER PUBLICATIONS

International Search Report and Written Opinion of the International Searching Authority for PCT International Application No. PCT/FR2019/050377 dated Jun. 3, 2019.

(Continued)

*Primary Examiner* — Robert J May
(74) *Attorney, Agent, or Firm* — Howard & Howard Attorneys PLLC

(57) ABSTRACT

A safety-related signalling device for a motor vehicle including a light guide, a first light source capable of emitting a light beam that illuminates a lateral face of the light guide to allow the light beam to propagate in the light guide, and a reflective screen having a front face located at a distance and across from a rear face of the light guide. The light guide is translucent and light-coloured, and the reflective screen promotes diffuse reflection of the light from the light guide so as to homogenize and intensify, on a front face, the light emitted by the light guide.

14 Claims, 5 Drawing Sheets

(51) Int. Cl.
*F21S 43/20* (2018.01)
*B60Q 1/00* (2006.01)
*B60Q 1/26* (2006.01)
*F21V 3/04* (2018.01)

(52) U.S. Cl.
CPC ........... *F21S 43/249* (2018.01); *F21S 43/255* (2018.01); *F21S 43/26* (2018.01); *F21V 3/049* (2013.01)

(58) Field of Classification Search
CPC ...... F21S 43/245; F21S 43/247; F21S 43/249; F21S 43/251; G02B 6/0051; G02B 6/0053; G02B 6/0055
See application file for complete search history.

(56) References Cited

U.S. PATENT DOCUMENTS

| | | | |
|---|---|---|---|
| 8,820,991 B2* | 9/2014 | Godbillon | F21S 43/40 362/511 |
| 9,822,944 B2* | 11/2017 | Zelikovskaya | F21S 43/14 |
| 10,174,902 B2* | 1/2019 | Nakashima | F21S 43/26 |
| 2004/0130904 A1 | 7/2004 | Yamada et al. | |
| 2007/0121334 A1 | 5/2007 | Bourdin et al. | |
| 2012/0274462 A1* | 11/2012 | Martinez | F21S 43/245 340/479 |
| 2016/0312973 A1 | 10/2016 | Brosinger et al. | |
| 2016/0341392 A1 | 11/2016 | Zelikovskaya et al. | |
| 2017/0241616 A1 | 8/2017 | Nakashima et al. | |
| 2017/0350571 A1 | 12/2017 | Gold et al. | |

FOREIGN PATENT DOCUMENTS

| | | |
|---|---|---|
| DE | 102008057538 A1 | 7/2009 |
| DE | 102013021086 A1 | 6/2015 |
| DE | 102014110225 A1 | 1/2016 |
| DE | 102016208640 A1 | 11/2016 |
| DE | 102017111805 A1 | 12/2017 |
| EP | 0180145 A1 | 5/1986 |
| EP | 1541920 A1 | 6/2005 |
| EP | 1775511 A1 | 4/2007 |
| EP | 2384934 A1 | 11/2011 |
| EP | 2518392 A2 | 10/2012 |
| FR | 3031794 A1 | 7/2016 |
| JP | 2015153577 A | 8/2015 |

OTHER PUBLICATIONS

International Search Report and Written Opinion of the International Searching Authority for PCT International Application No. PCT/FR2019/050378 dated Jun. 3, 2019.

* cited by examiner

SIGNALING DEVICE FOR A MOTOR VEHICLE

CROSS-REFERENCE TO RELATED APPLICATIONS

The present application is a National Stage of International Patent Application No. PCT/FR2019/050377, filed on Feb. 19, 2019, which claims priority to and all the benefits of French Patent Application No. 1851412, filed on Feb. 19, 2018, both of which are hereby expressly incorporated herein by reference in their entirety.

BACKGROUND OF THE INVENTION

1. Field of the Invention

The present invention relates to a signalling device for a motor vehicle, comprising at least one homogeneously and intensely illuminated luminous screen.

2. Description of the Related Art

For obvious safety reasons, the regulation states that motor vehicles shall be equipped with lighting and signalling devices. Over time, the lighting and signalling devices also became aesthetic elements usable to customize the style of each motor vehicle.

The surface light sources are particularly prized for that purpose, due to their large, homogeneous lighting surface for a small depth. The recent technical advances have allowed contemplating the use of the organic light-emitting diodes, also known as OLEDs, both inside and outside the motor vehicles.

An organic light-emitting diode or Organic LED is composed of a substrate, two electrodes intended to inject charges of opposite sign and an organic layer interposed between the electrodes. The Organic LED emits light when the electrodes make a sufficient electric current pass through the organic layer. At least one electrode must be transparent so that the light scatters out. The electrodes are power-supplied through electric connectors arranged at the periphery of the Organic LED. The electric connectors are usually concealed behind a fastening frame having a certain thickness and surrounding the Organic LED. The position of the electric connectors or the presence of the fastening frame makes it difficult to arrange them so as to form a single and same continuous luminous surface. That way, the homogeneous lighting surfaces obtained from Organic LEDs are generally limited to the dimensions of the Organic LED itself. For economic and technical reasons, the Organic LEDs currently used in the automotive field are limited to a few square centimetres. It is hence not possible to form homogeneous luminous surfaces of great size and low cost.

According to another drawback, the OLED light sources are far more expensive than the light sources based on filament bulbs or light-emitting diodes (LEDs). Moreover, the low thickness of an OLED with respect to its luminous surface area makes it particularly vulnerable to shocks. The Organic LEDs are hence very fragile and require a careful and cautious use. Now, the environment of a motor vehicle is not favourable to the use of an Organic LED due to the numerous mechanical stresses, in particular vibrations and accelerations, and thermal stresses to which these components are subjected. This environment hence frequently causes failures of the lighting devices installed on board the motor vehicles using Organic LEDs.

The invention aims to solve these technical problems by proposing a signalling device for a motor vehicle, comprising at least one homogeneously and intensely illuminated luminous screen, which is of greater size, more reliable and less expensive than the organic light-emitting diodes.

SUMMARY OF THE INVENTION

For that purpose, the invention proposes a signalling device for a motor vehicle, comprising a light guide delimited by a front face, parallel or substantially parallel to a rear face, lateral faces connecting the front face to the rear face. The signalling device also comprises a first light source capable of emitting a light beam. The first light source is arranged so as to illuminate a lateral face of the light guide to allow the propagation of the light beam between the front face and the rear face of the light guide. A reflection screen is arranged so that its front face is located remote from and opposite the rear face of the light guide.

In one embodiment, the light guide is translucent, and in that the front face of the reflection screen is light-coloured and favours a diffuse reflection of the light coming from the light guide. In one embodiment, the front face of the reflection screen is of white colour and matt appearance.

Advantageously, the light guide is translucent to favour a greater scattering of the light beam propagating in the guide, through its front face and its rear face. By "translucent", it is meant the property of the light guide to let the daylight through, without possibility of sharply distinguishing the contours or the colours of an object placed behind said guide.

In order to increase the light intensity at the front face of the light guide, a reflection screen is placed opposite its rear face. The front face of the reflection screen is light-coloured and configured to allow a diffuse reflection of the light coming from the light guide. The inventors have surprisingly observed that a diffuse reflection is far more advantageous than a specular reflection, to redirect a greater amount of light towards the light guide. The front face of the reflection screen may be substantially white or white colour. The appearance of the front face can be matt or bright. The inventors have observed a more intense reflection the light when the front face of the reflection screen is of matt appearance.

The combination of the translucent properties of the light guide and of the diffuse reflection properties of the front face of the reflection screen makes it possible to obtain a more homogeneous and more intense luminous surface at the front face of the light guide, when the first light source is on.

According to another advantage, the use of a light guide allows the making of luminous surfaces of shapes and dimensions far more varied than the organic light-emitting diodes. The front face of the light guide can be planar or in relief, and its surface area can be comprised between a few square centimetres and a few tens of square centimetres. The presence of the reflection screen advantageously makes it possible to increase the light intensity emitted by the first light source, through its front face, for a bulk similar to that of the organic light-emitting diodes.

The invention hence proposes a signalling device offering a more intense and homogeneous luminous surface, whose dimensions and shapes can be more various with respect to the organic light-emitting diodes, while being more robust and less expensive.

According to a variant embodiment, the spacing between the front face of the reflection screen and the rear face of the light guide is comprised between 0.05 and 0.15 mm, preferably of the order of 0.1 mm. The value of this spacing favours a diffuse and homogeneous reflection of the light at the rear face of the light guide, while allowing the passage of an air flow to limit any phenomenon of condensation. In one embodiment, the front face of the reflection screen is parallel or substantially parallel to the rear face of the light guide, in order to favour a still more homogeneous diffuse reflection.

According to another embodiment, the light guide is formed of a transparent material, and the light guide includes light-scattering elements. The translucent character of the light guide is obtained by the presence of scattering elements. The scattering elements may include cavities opening to the rear face of the light guide, the inner volume of each cavity being comprised between 48 000 $\mu m^3$ and 536 000 $\mu m^3$, preferably of the order of 95 000 $\mu m^3$ and 268 000 $\mu m^3$, in a preferred manner of the order of 218 000 $\mu m^3$. The cavities are spaced apart, at the rear face of the light guide, by a distance comprised between 0.12 mm and 0.7 mm, preferably between 0.13 mm and 0.5 mm.

According to another variant embodiment, the signalling device comprises a second light source, arranged so that the reflection screen is comprised between the second light source and the light guide, and in that the reflection screen includes at least one passage allowing the transmission of a light beam emitted by the second light source. The reflection screen may include at least one passage forming an opening at the front face of the reflection screen, whose surface area is comprised between 0.03 $mm^2$ and 0.3 $mm^2$. The spacing between the openings is comprised between 0.08 mm and 0.6 mm, preferably between 0.12 mm and 0.45 mm.

According to another variant embodiment, the front face of the light guide is covered, at least partially, with a decorative pattern. The decorative pattern is visible in daylight by an observer of the signalling device. In one embodiment, the decorative pattern lets through at least a part of the light beam emitted by the first light source and/or the second light source. The decorative pattern may be silk-screened on the front face of the light guide.

According to another variant embodiment, the signalling device comprises a translucent screen placed opposite and remote from the front face of the light guide. The spacing between the front face of the light guide and the translucent screen is comprised between 0.05 mm and 0.15 mm, preferably of the order of 0.1 mm. The value of this spacing allows favouring a more homogeneous scattering of the light through the translucent screen, while allowing the passage of an air flow to limit any phenomenon of condensation. In one embodiment, the rear face of the translucent screen, opposite the light guide, is parallel of substantially parallel to said guide, in order to favour a more homogeneous scattering along the translucent screen.

According to one embodiment, a front face of the translucent screen is partially covered with a decorative pattern. The decorative pattern is visible in daylight by an observer of the signalling device. The decorative pattern can let through at least a part of the light beam emitted by the first light source and/or the second light source. The decorative pattern can be present on a front face of the translucent screen, opposed to the front face of the light guide. The decorative pattern may be silk-screened on the front face of the translucent screen.

Of course, the different characteristics, variants and embodiments mentioned hereinabove may be associated with each other according to various combinations, insofar as they are not incompatible or exclusive with respect to each other.

The invention also relates to a motor vehicle comprising one of the above-described signalling devices.

Other objects, features and advantages of the present invention will be readily appreciated as the same becomes better understood after reading the subsequent description taken in connection with the accompanying drawings.

BRIEF DESCRIPTION OF THE DRAWINGS

The following description in relation with the appended drawings, given by way of non-limitative examples, will allow a good understanding of what the invention consists of and of how it can be implemented.

DETAILED DESCRIPTION OF THE INVENTION

The present invention relates, generally, to a signalling device for a motor vehicle, comprising at least one homogeneously and intensely illuminated luminous screen, which is of greater size, more reliable and less expensive than the organic light-emitting diodes.

Figure 1:
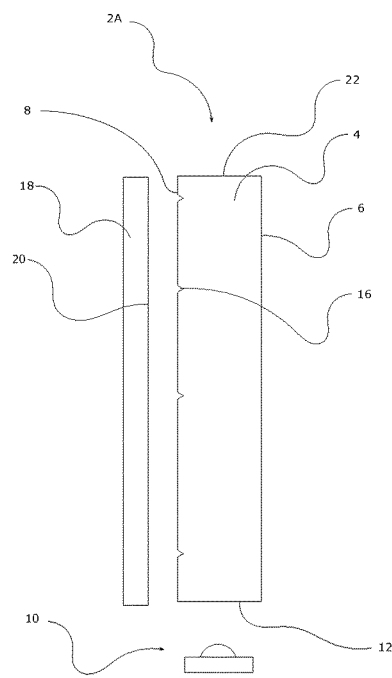
FIGS. 1 and 2 illustrate a cross-section of a first embodiment of a signalling device according to the invention, in the off and on state, respectively.
Figure 2:
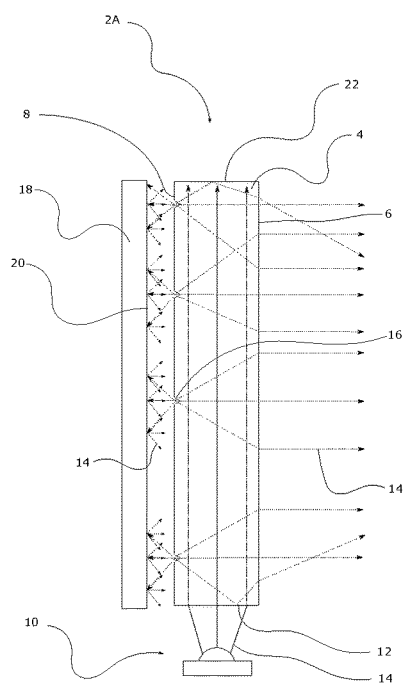

FIGS. 1 and 2 illustrate a first embodiment of a signalling device 2A according to the invention. This signalling device includes a light guide 4 delimited by a front face 6, parallel or substantially parallel to a rear face 8. The front and rear faces are connected to each other by lateral faces that delimit the contour of the light guide 4. The light guide is of planar shape. However, this exemplary embodiment is not limitative of the invention, in that the light guide 4 could have parts of concave and/or convex shape.

The light guide 4 is formed of a transparent material, letting the daylight through and allowing the contours and the colour of an object placed behind the light guide to be sharply distinguished. By way of example, the light guide 4 may be formed of poly(methylmethacrylate) (PMMA) and have a thickness comprised between 1 mm and 5 mm, preferably of the order of 3 mm. By "thickness", it is meant the smallest distance between the front face 6 and the rear face 8 of the light guide.

The signalling device 2A includes a first light source 10, arranged opposite a lateral face of the light guide 4 hereinafter called input lateral face 12. As illustrated in FIG. 2, the first light source 10 is directed so as to allow the propagation of a light beam 14 emitted by said light source, between the front face 6 and the rear face 8 of the light guide. The first light source 10 can include one or several light-emitting diodes, each diode illuminating a portion of the input lateral face 12. The light-emitting diodes may be spaced apart in order to homogeneously illuminate the input lateral face 12. The colour and the light intensity of each light-emitting diode can be modified over time in order to create light animations in the light guide 4.

In order to favour a greater scattering of the light beam 14 through the front face 6 and the rear face 8 of the light guide 4, light-scattering elements are present in the light guide 4. These scattering elements comprise cavities 16 opening to the rear face 8 of the light guide. The cavities 16 are positioned in the light guide 4 so as, on the one hand, to make the light guide translucent and, on the other hand, to favour a substantially homogeneous scattering of a light beam 14 through the front face 6. By "translucent", it is meant the property of the light guide 4 to let the daylight beams through, without possibility of sharply distinguishing through its front face 6 the contours or the colours of an object placed opposite its rear face 8.

Each cavity 16 delimits an inner volume that is comprised between 48 000 $\mu m^3$ and 536 000 $\mu m^3$, preferably between 95 000 $\mu m^3$ and 268 000 $\mu m^3$. According to the present example, each cavity has a volume of the order of 218 000 $\mu m^3$. The cavities are arranged so as to be spaced apart at the rear face 8 of the light guide by a distance comprised between 0.12 mm and 0.7 mm, preferably between 0.13 mm and 0.5 mm. According to the present example, the cavities 16 are conical in shape, their base being delimited by the rear face 8 of the light guide, their apex forming an angle of the order of 60°, their height being of the order of 0.05 mm and the diameter of their base being of the order of 0.1 mm.

In order to increase the intensity of the light beam 14 scattered through the front face 6 of the light guide 4, a reflection screen 18 is placed opposite and remote from its rear face 8. The spacing between the reflection screen 18 and the light guide 4 is comprised between 0.05 mm and 0.15 mm, preferably of the order of 0.1 mm. The reflection screen 18 includes a front face 20, parallel or substantially parallel to the rear face 8 of the light guide 4. Advantageously, the front face 20 of the reflection screen is of white colour and matte appearance. The surface of the front face 20 is configured to favour a diffuse reflection of the light coming from the rear face of the light guide 4. By diffuse reflection, it is meant that the light is reflected in all the directions with, possibly, a higher light intensity towards the light guide 4. According to the present example, the front face 20 of the reflection screen is rough so as to scatter the light in a Lambertian way. According to the present example, the reflection screen 18 is made of polycarbonate and its thickness is of the order of 0.5 mm. The thickness is measured along a direction normal or substantially normal to the front face 6 of the light guide 4.

Figure 3:
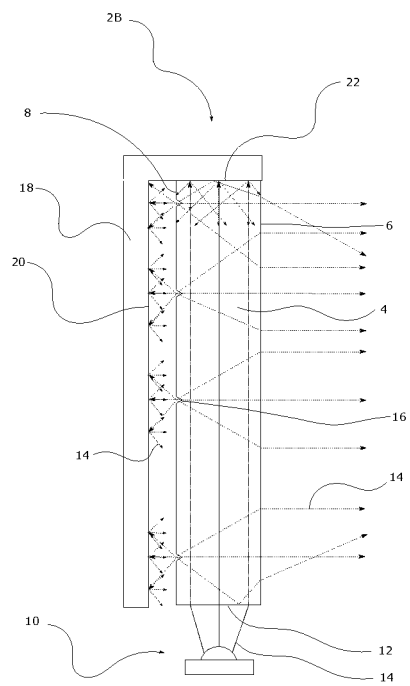
FIG. 3 illustrates a variant embodiment of the signalling device shown in FIG. 2.

According to a variant embodiment of the invention illustrated in FIG. 3, a signalling device 2B includes a lateral face of the light guide 4, called output lateral face 22, opposed to the input lateral face 12, covered with a layer favouring the reflection of the light beam 14 in said guide. Preferably, a part of the reflection screen 18 covers the output lateral face 22.

The identical elements between the different embodiments and variant embodiments of the invention are identified by the same references on the appended figures.

Figure 4:
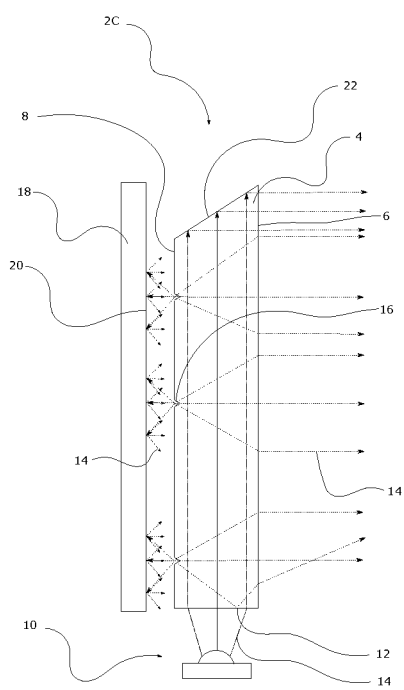
FIG. 4 illustrates another variant embodiment of the signalling device shown in FIG. 2.

According to another variant embodiment of the invention, illustrated in FIG. 4, a signalling device 2C includes an output lateral face 22 forming an inner angle with the front face 6 of the light guide. The value of this inner angle is chosen to favour a direct reflection of the light beam 14 towards the front face 6 of the light guide 4. The value of this inner angle is preferably of the order of 45°.

According to another variant embodiment, not shown, the front face 6 of the light guide 4 is partially covered with a decorative pattern. The decorative pattern is preferably opaque to daylight. The decorative pattern can also be partially translucent to the light beam 14 emitted by the first light source 10, so as to form a dark pattern when said source is on. The decorative pattern is preferably coloured to form a pattern of colour(s) when the first light source is off. The decorative pattern can be silk-screened on the front face of the light guide 4.

Figure 5:
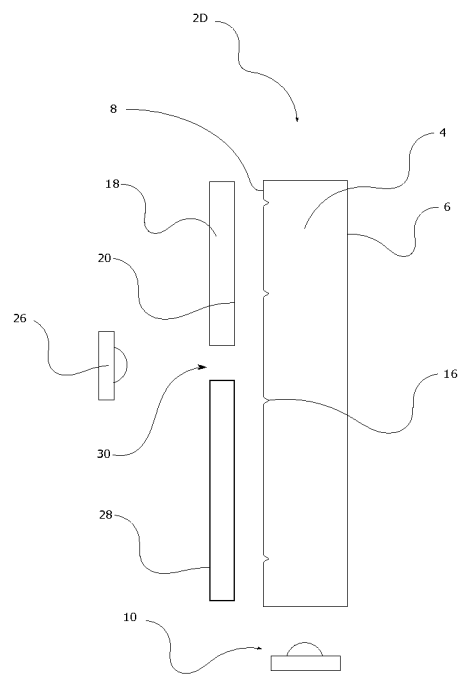
FIGS. 5 and 6 illustrate a cross-section of a second embodiment of a signalling device according to the invention, in the off and on state, respectively.
Figure 6:
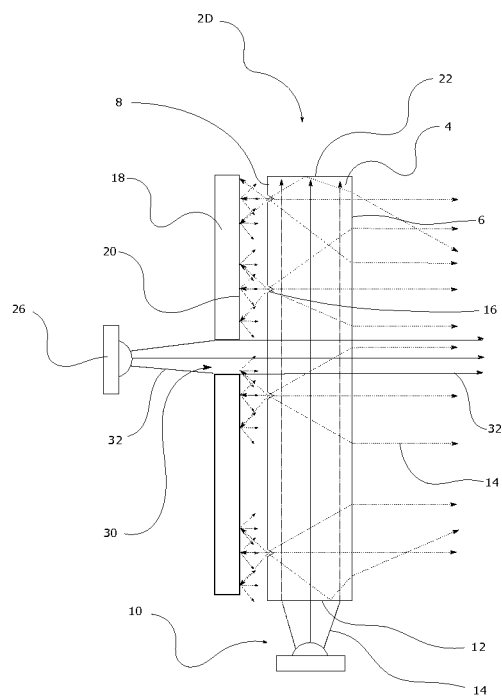

According to a second embodiment of the invention illustrated by FIGS. 5 and 6, the signalling device 2D includes a second light source 26. The second light source is positioned so as to illuminate a rear face 28 of the reflection screen 18. The reflection screen 18 includes at least one passage 30. As illustrated in FIG. 6, each passage allows a part of a light beam 32, emitted by the second light source 26, to illuminate the rear face 8 of the light guide 4. Each passage 30 forms an opening at the front face 20 of the reflection screen, whose surface area is comprised between 0.03 $mm^2$ and 0.3 $mm^2$. Preferably, the passages form circular openings. The openings are spaced apart by a distance comprised between 0.08 mm and 0.6 mm, preferably between 0.12 mm and 0.45 mm.

Figure 7:
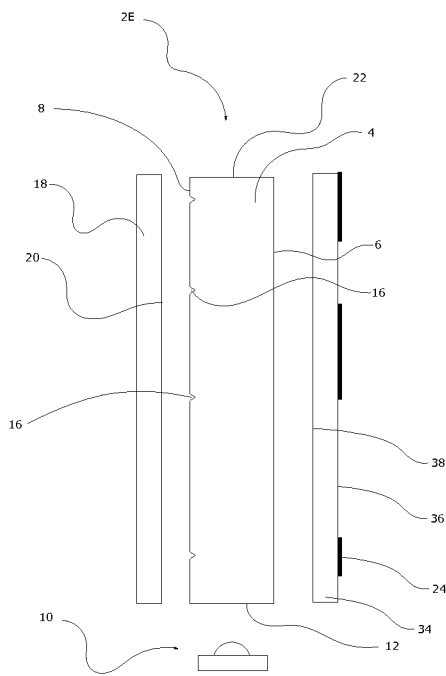
FIGS. 7 and 8 illustrate a cross-section of a third embodiment of a signalling device according to the invention, in the off and on state, respectively.
Figure 8:
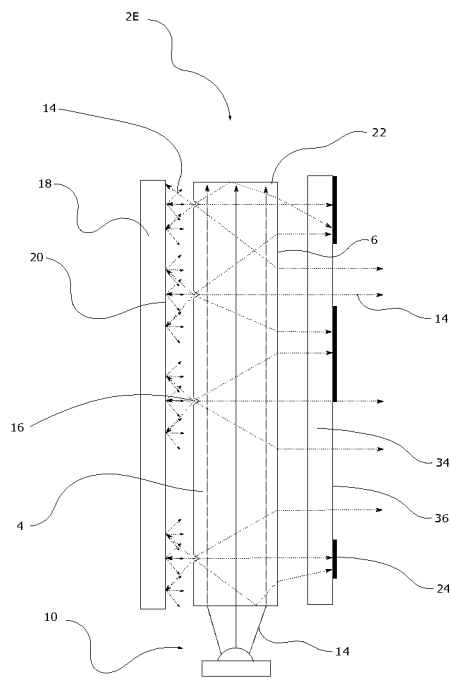

According to a third embodiment of the invention illustrated in FIGS. 7 and 8, the signalling device 2E includes a translucent screen 34 placed remote from and opposite the front face 6 of the light guide 4. The spacing between the light guide 4 and the translucent screen 34 is comprised between 0.05 mm and 0.15 mm, preferably of the order of 0.1 mm. The translucent screen 34 includes a front face 36, parallel or substantially parallel to the front face 6 of the light guide 4. According to the present example, a rear face 38 of the translucent screen is rough so as to scatter the light in a Lambertian way. The rear face of the translucent screen 34 is of bright appearance, preferably of matte appearance. According to the present example, the translucent screen 34 is made of polycarbonate and its thickness is of the order of 0.5 mm. The thickness measured along a direction normal or substantially normal to the front face of the light guide 4.

According to a variant embodiment, the signalling device 2E includes a translucent screen 34 configured to make the light rays coming from the light guide 4 converge towards a scene located in front of the signalling device 2. Preferably, most of the light beams exiting from the translucent screen 34 are parallel or substantially parallel to an axis perpendicular or substantially perpendicular to the front face 6 of the light guide 4.

According to another variant embodiment, the signalling device 2E includes a translucent screen 34 whose front face 6 is partially covered with a decorative pattern 24. The decorative pattern is preferably opaque to daylight. The decorative pattern can also be partially translucent to the light beam 14 emitted by the first light source 10, so as to form a dark pattern when said source is on. The decorative pattern is preferably coloured to form a pattern of colour(s) when the first light source is off. The decorative pattern can be silk-screened on the front face 36 of the translucent screen 34.

Figure 9:
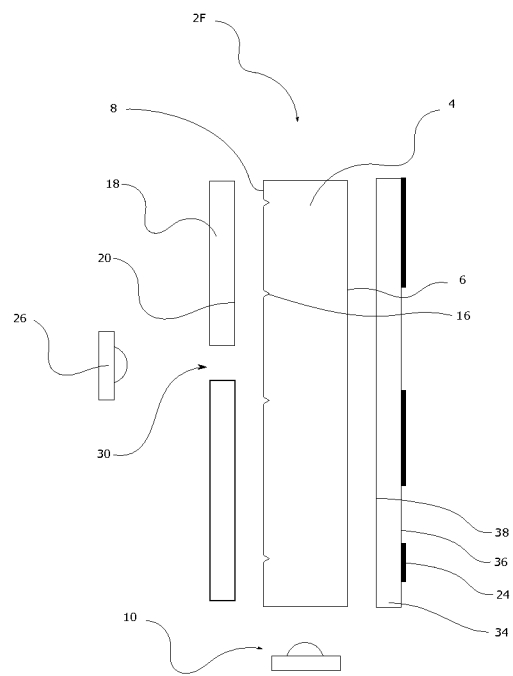
FIGS. 9 and 10 illustrate a cross-section of a first embodiment of a signalling device according to the invention, in the off and on state, respectively.
Figure 10:
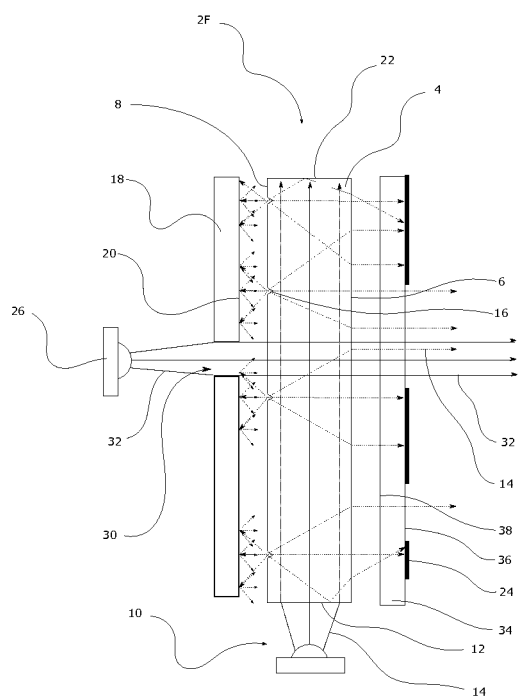

The variant embodiments described hereinabove can be combined together to obtain news embodiments. FIGS. 9 and 10 illustrate for example a new embodiment of a signalling device 2F according to the invention, combining the features of the signalling devices 2D and 2E.

According to a variant embodiment, not illustrated, a signalling device according to the invention can comprise several light guides, so as to form several distinct light surfaces. Each light guide can be illuminated by a first dedicated light source, whose intensity and colour can be controlled independently from the other light sources by a control unit, in order to create visual animations and/or to adapt the brightness of the light signals as a function of the ambient light.

As a conclusion, thanks to the presence of scattering elements in the light guide and the arrangement of a reflection screen behind said guide, a signalling device according to the invention allows scattering in a more homogeneous and more intense way, through its front face, a light beam propagating in said guide. For a bulk similar to that of the light-emitting diodes, the use of a light guide according to the invention allows the creation of luminous surfaces which are of greater size, of more varied shapes, more resistant and less expensive. The present invention hence proposes a new type of light signalling for a motor vehicle, comprising one or several luminous screens whose intensity is high and homogeneous. The invention allows a greater variety of embodiments of light signalling devices for a motor vehicle, allowing a more attractive design for this type of device, to offer an attractive security.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A signalling device for a motor vehicle, comprising a light guide delimited by a front face, substantially parallel to a rear face, lateral faces connecting the front face to the rear face, a first light source capable of emitting a light beam illuminating a lateral face of the light guide to allow the propagation of the light beam between the front face and the rear face of the light guide, a reflection screen including a front face arranged remote from and opposite the rear face of the light guide, the light guide being translucent, and wherein the front face of the reflection screen being light-coloured and favours a diffuse reflection of the light coming from the light guide, wherein the signalling device comprises a second light source, arranged so that the reflection screen is comprised between the second light source and the light guide, and wherein the reflection screen includes at least one passage allowing the transmission of a light beam emitted by the second light source.

2. The signalling device as set forth in claim 1, wherein the spacing between the front face the reflection screen and the rear face of the light guide is comprised between 0.05 and 0.15 mm, preferably of the order of 0.1 mm.

3. The signalling device as set forth in claim 1, wherein the light guide is formed of a transparent material, and wherein the light guide includes light-scattering elements.

4. The signalling device as set forth in claim 3, wherein the scattering elements comprise cavities opening to the rear face of the light guide, and wherein the inner volume of each cavity is comprised between 48 000 $\mu m^3$ and 536 000 $\mu m^3$, preferably of the order of 95 000 $\mu m^3$ and 268 000 $\mu m^3$, in a preferred manner of the order of 218 000 $\mu m^3$.

5. The signalling device as set forth in claim 4, wherein the cavities are spaced apart, at the rear face of the light guide, by a distance comprised between 0.12 mm and 0.7 mm, preferably between 0.13 mm and 0.5 mm.

6. The signalling device as set forth in claim 1, wherein the reflection screen includes at least one passage forming an opening at its front face, whose surface area is comprised between 0.03 $mm^2$ and 0.3 $mm^2$.

7. The signalling device as set forth in claim 1, wherein the front face of the light guide is covered, at least partially, with a decorative pattern.

8. The signalling device as set forth in claim 7, wherein the decorative pattern lets through at least a part of the light beam emitted by the first light source.

9. The signalling device as set forth in claim 1, wherein it comprises a translucent screen placed opposite and remote from the front face of the light guide.

10. The signalling device as set forth in claim 9, wherein the spacing between the front face of the light guide and the translucent screen is comprised between 0.05 mm and 0.15 mm, preferably of the order of 0.1 mm.

11. The signalling device as set forth in claim 9, wherein a front face of the translucent screen is partially covered with a decorative pattern.

12. The signalling device as set forth in claim 11, wherein the decorative pattern lets through at least a part of the light beam emitted by the first light source.

13. The signalling device as set forth in claim 12, wherein the decorative pattern is present on a front face of the translucent screen, opposed to the front face of the light guide.

14. A motor vehicle comprising a signalling device as set forth in claim 1.

* * * * *